US008442570B1

(12) United States Patent
Shetty et al.

(10) Patent No.: US 8,442,570 B1
(45) Date of Patent: May 14, 2013

(54) WIRELESS TUNE AWAY BASED UPON WIRELESS DEVICE STATE

(75) Inventors: Manoj Shetty, Overland Park, KS (US); Sachin R. Vargantwar, Overland Park, KS (US); Deveshkumar Narendrapratap Rai, Overland Park, KS (US); Bhagwan Singh Khanka, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 494 days.

(21) Appl. No.: 12/730,750

(22) Filed: Mar. 24, 2010

(51) Int. Cl.
*H04B 7/00* (2006.01)
*H04M 1/00* (2006.01)

(52) U.S. Cl.
USPC ............................. 455/515; 455/552.1

(58) Field of Classification Search ............... 455/426.1, 455/434, 550.1, 552.1, 515; 370/310, 328
See application file for complete search history.

(56) References Cited

U.S. PATENT DOCUMENTS

| | | |
|---|---|---|
| 6,507,743 B1 | 1/2003 | Abrishamkar et al. |
| 6,650,912 B2 | 11/2003 | Chen et al. |
| 6,771,616 B2 | 8/2004 | Abrishamkar et al. |
| 6,829,485 B2 | 12/2004 | Abrishamkar et al. |
| 6,895,058 B2 | 5/2005 | Abrishamkar et al. |
| 2001/0044313 A1 | 11/2001 | Abrishamkar |
| 2003/0152049 A1* | 8/2003 | Turner ........................... 370/331 |
| 2005/0124334 A1* | 6/2005 | Rajkotia ..................... 455/422.1 |
| 2006/0176870 A1 | 8/2006 | Joshi et al. |
| 2007/0072643 A1 | 3/2007 | Jiang et al. |
| 2007/0097922 A1 | 5/2007 | Parekh et al. |
| 2007/0183355 A1* | 8/2007 | Kuchibhotla et al. .......... 370/318 |
| 2007/0258436 A1 | 11/2007 | Kulkarni et al. |
| 2008/0198811 A1 | 8/2008 | Deshpande et al. |
| 2009/0059841 A1* | 3/2009 | Laroia et al. ................... 370/328 |
| 2009/0141689 A1 | 6/2009 | Parekh et al. |

OTHER PUBLICATIONS

U.S. Appl. No. 12/758,190, filed Apr. 12, 2010.
U.S. Appl. No. 12/765,160, filed Apr. 22, 2010.
U.S. Appl. No. 12/701,382, filed Feb. 5, 2010.

* cited by examiner

*Primary Examiner* — Nguyen Vo

(57) ABSTRACT

What is disclosed is a method of operating a wireless communication device. The method includes entering an active state in a first wireless communication mode that requires tuning to a first frequency spectrum, and in response, setting a timer for monitoring a second wireless communication mode. If the timer expires during the active state in the first wireless communication mode, then the method includes tuning away from the first frequency spectrum to a second frequency spectrum for the second wireless communication mode and monitoring information for the second wireless communication mode. If the wireless communication device transitions from the active state to an idle state in the first wireless communication mode before the timer expires, then the method includes tuning away from the first frequency spectrum to the second frequency spectrum for the second wireless communication mode and monitoring the information for the second wireless communication mode.

12 Claims, 5 Drawing Sheets

WIRELESS TUNE AWAY BASED UPON WIRELESS DEVICE STATE

TECHNICAL FIELD

Aspects of the disclosure are related to the field of communications, and in particular, tune away of wireless communication devices in wireless communication networks.

TECHNICAL BACKGROUND

Wireless communication systems typically include wireless access systems, with equipment such as base stations, which provide wireless access to communication services for user devices over wireless links. A typical wireless communication system includes systems to provide wireless access across a geographic region, with wireless coverage areas associated with individual base stations. The wireless access system exchanges user communications and overhead communications between wireless communication devices and a core network of the wireless communication system.

The wireless communication system also typically transfers information to the user devices to indicate incoming voice calls, text messages, network alerts, or other alerts and messages. This information, often referred to as network information or paging information, is routed through the wireless access system to reach the wireless communication devices via special wireless communication channels, frequency spectrums, or timeslots. Many examples of wireless communication devices include devices which support multiple communication modes, such as multiple wireless communication protocols. The wireless communication devices often must receive the network information over a specific wireless communication mode, even when communicating in a different wireless communication mode.

OVERVIEW

What is disclosed is a method of operating a wireless communication device. The method includes entering an active state in a first wireless communication mode that requires tuning to a first frequency spectrum, and in response, setting a timer for monitoring a second wireless communication mode. If the timer expires during the active state in the first wireless communication mode, then the method includes tuning away from the first frequency spectrum to a second frequency spectrum for the second wireless communication mode and monitoring information for the second wireless communication mode. If the wireless communication device transitions from the active state to an idle state in the first wireless communication mode before the timer expires, then the method includes tuning away from the first frequency spectrum to the second frequency spectrum for the second wireless communication mode and monitoring the information for the second wireless communication mode.

What is also disclosed is a wireless communication device. The wireless communication device includes a processing system configured to enter an active state in a first wireless communication mode that requires tuning a transceiver to a first frequency spectrum, and in response, the processing system is configured to set a timer for monitoring a second wireless communication mode. If the timer expires during the active state in the first wireless communication mode, then the transceiver is configured to tune away from the first frequency spectrum to a second frequency spectrum for the second wireless communication mode and monitor information for the second wireless communication mode. If the wireless communication device transitions from the active state to an idle state in the first wireless communication mode before the timer expires, then the transceiver is configured to tune away from the first frequency spectrum to the second frequency spectrum for the second wireless communication mode and monitor the information for the second wireless communication mode.

What is also disclosed is a method of operating a wireless communication device, where the wireless communication device receives wireless service from a wireless communication network. The method includes monitoring network information of the wireless communication network over a first communication channel at a first monitoring interval, and receiving user communications over a second communication channel. The method also includes determining an activity state of the wireless communication device, processing the activity state of the wireless communication device to determine a second monitoring interval, and monitoring the network information over the first communication channel at the second monitoring interval.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
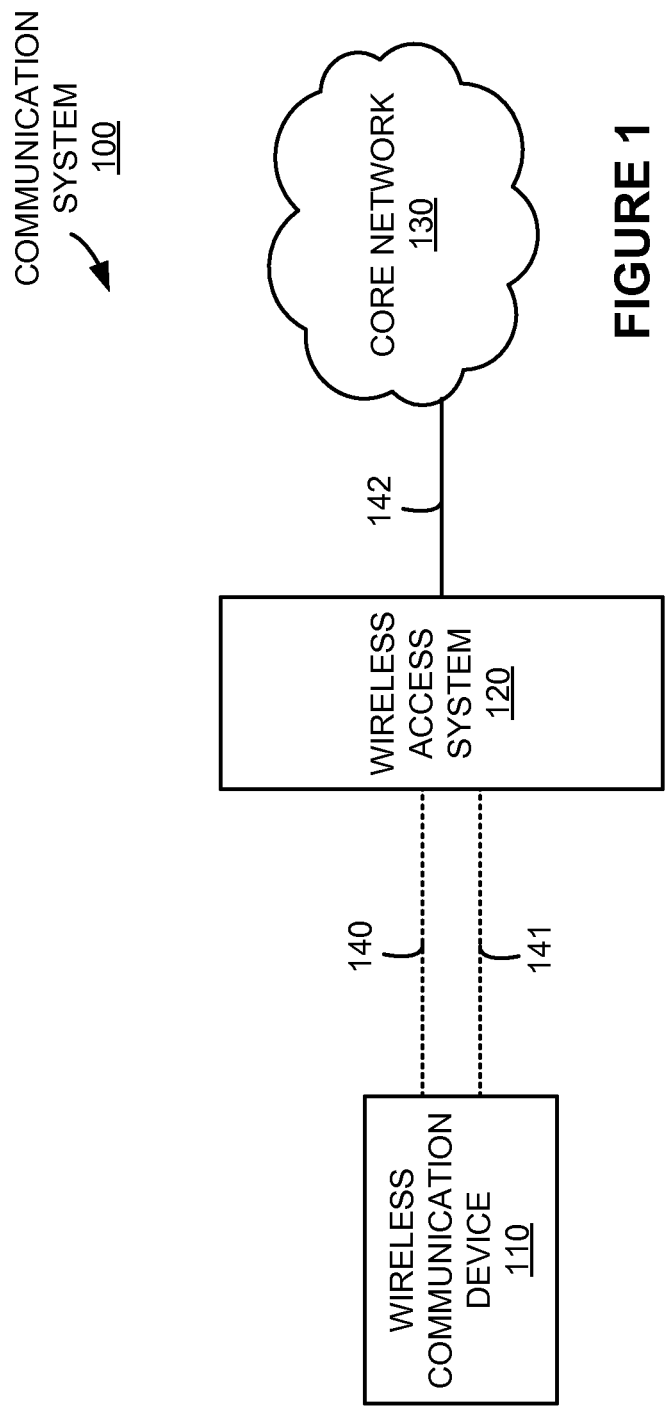
FIG. 1 is a system diagram illustrating a communication system.

FIG. 1 is a system diagram illustrating communication system 100. Communication system 100 includes wireless communication device 110, wireless access system 120, and core network 130. Wireless communication device 110 and wireless access system 120 communicate over wireless links 140-141. Wireless access system 120 and core network 130 communicate over link 142. Wireless communication device 110 receives wireless service through wireless access system 120, which could include accessing communication services of core network 130, or exchanging communications with systems of core network 130. Also in this example, wireless access system 120 provides wireless service to wireless communication device 110 using a first wireless communication mode over wireless link 140 and using a second wireless communication mode over wireless link 141.

Figure 2:
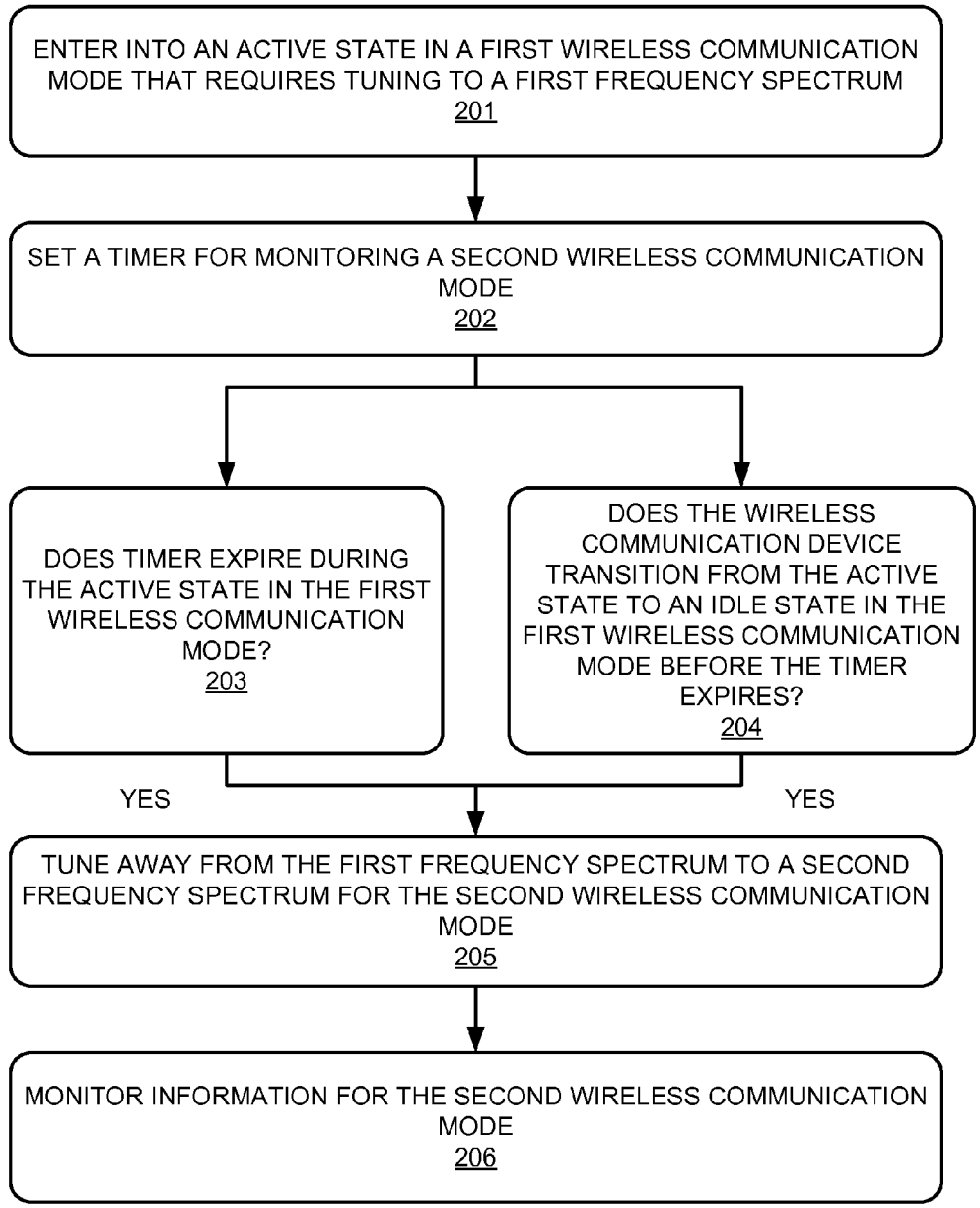
FIG. 2 is a flow diagram illustrating a method of operation of a wireless communication device.

FIG. 2 is a flow diagram illustrating a method of operation of wireless communication device 110. The operations of FIG. 2 are referenced herein parenthetically. In FIG. 2, wireless communication device 110 enters (201) into an active state in a first wireless communication mode that requires tuning to a first frequency spectrum. In this example, the first communication mode is provided over a first frequency spectrum represented by wireless link 140, where wireless communication device 110 tunes to the first frequency spectrum for communication over wireless link 140. The active state could include where wireless communication device 110 is registered for communication service with wireless access system 120 and is engaging in user communications through wireless access system 120. In other examples, the active state includes when user data or user traffic is presently being exchanged between wireless communication device 110 and wireless access system 120 in the first wireless communication mode. In further examples, the active state could include entering into a voice call, engaging in a data session, transferring data, watching a video, running an application, or other activity state on wireless communication device 110.

In response to entering the active state in the first wireless communication mode, wireless communication device 110 sets (202) a timer for monitoring a second wireless communication mode. In this example, the second communication mode is provided over wireless link 141. The first and second wireless communication modes could include different communication modes, or similar communication modes. For example, the first wireless communication mode could include communicating over a first wireless link using a first wireless communication protocol that uses a first frequency spectrum, while the second wireless communication mode could include communicating over a second wireless link using a second wireless communication protocol that uses a second frequency spectrum, although other configurations could be employed.

If the timer expires during the active state in the first wireless communication mode (203), then wireless communication device 110 tunes away (205) from the first frequency spectrum to a second frequency spectrum for the second wireless communication mode, and wireless communication device 110 monitors (206) information for the second wireless communication mode. In this example, the second communication mode is provided over a second frequency spectrum represented by wireless link 141, where wireless communication device 110 tunes to the second frequency spectrum for communication over wireless link 141. The information monitored by wireless communication device 110 for the second wireless communication mode could include network information, network alerts, paging information, pages, call alerts, channel assignments, access parameter messages (APM), system parameter messages (SPM), extended channel assignment messages (ECAM), handoff information, or other information for the second wireless communication mode.

If wireless communication device 110 transitions from the active state to an idle state in the first wireless communication mode before the timer expires (204), then wireless communication device 110 tunes away (205) from the first frequency spectrum to a second frequency spectrum for the second wireless communication mode, and wireless communication device 110 monitors (206) the information for the second wireless communication mode. As discussed above, in this example the second communication mode is provided over a second frequency spectrum represented by wireless link 141, where wireless communication device 110 tunes to the second frequency spectrum for communication over wireless link 141. The idle mode could include transitioning from an active state to an inactive state, among other modes. For example, the idle mode could include ending a voice call, terminating an application, completing file transfer, ending a video session, or entering other inactive states. In some examples, the idle state indicates no user data or user traffic is presently being exchanged between wireless communication device 110 and wireless access system 120 in the first wireless communication mode.

Figure 3:
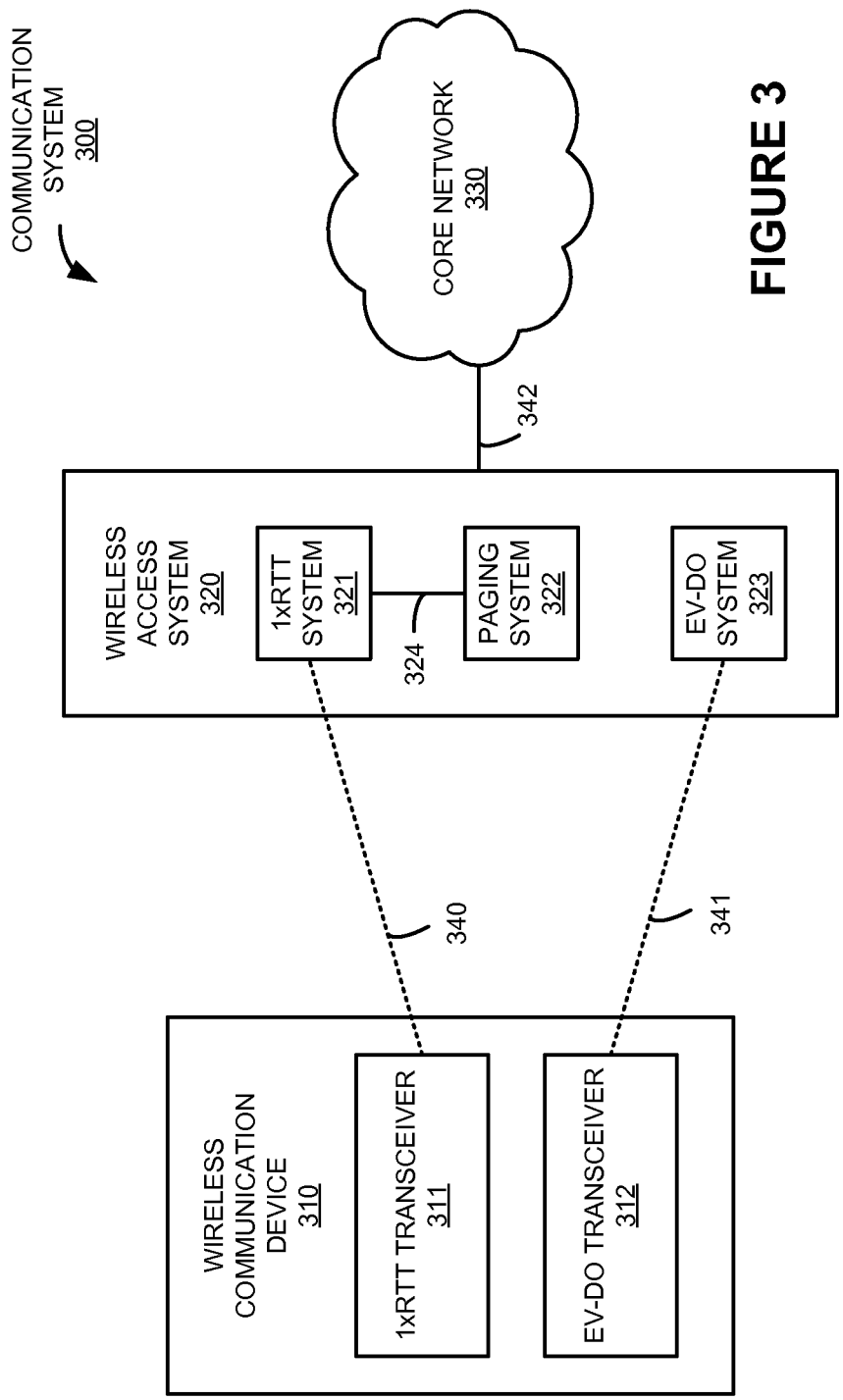
FIG. 3 is a system diagram illustrating a communication system.

FIG. 3 is a system diagram illustrating communication system 300. Communication system 300 includes wireless communication device 310, wireless access system 320, and core network 330. Wireless communication device 310 and wireless access system 320 communicate over wireless links 340 and 341. Wireless access system 320 and core network 330 communicate over link 342. Link 342 comprises a Metropolitan Area Network (MAN) link in this example.

Wireless communication device 310 comprises a mobile smartphone in this example. Wireless communication device 310 includes 1xRTT transceiver 311 and EV-DO transceiver, although other examples could use a different configuration. 1xRTT transceiver includes transceiver circuitry and an antenna. 1xRTT transceiver communicates with 1xRTT system 321 of wireless access system 320 over wireless link 340 using the Code Division Multiple Access (CDMA) single-carrier radio transmission technology (1xRTT) wireless protocol. EV-DO transceiver 312 includes transceiver circuitry and an antenna. EV-DO transceiver 312 communicates with EV-DO system 323 of wireless access system 320 over wireless link 341 using the Evolution Data Optimized (EV-DO) wireless protocol. In some examples, an antenna is shared between 1xRTT transceiver 311 and EV-DO transceiver 312.

Wireless access system 320 includes wireless access equipment and systems of a wireless communications provider in this example. Wireless access system 320 includes 1xRTT system 321, paging system 322, and EV-DO system 323, although other examples could use a different configuration. 1xRTT system 321 includes a base station and associated systems for communicating over the 1xRTT protocol, and EV-DO system 323 includes a base station and associated systems for communicating over the EV-DO protocol. 1xRTT system 321 receives paging information over link 324 from paging system 322. Paging system 322 includes equipment to determine paging information for delivery to 1xRTT system 321. In some examples, the paging information could be received from core network 330, while in other examples, the paging information could originate in paging system 322. The paging information could include call alerts, text messages, audio messages, network alerts, or other information for 1xRTT system 321. Wireless access system 320 also includes routers, gateways, or other related equipment for exchanging communications between wireless communication device 310 and core network 330 over link 342. Core network 330 is a core network of the wireless communications provider in this example. Core network 330 could include further wireless access systems, base stations, access control systems, routers, gateways, or other equipment and systems, and could communicate over the Internet with further systems.

Figure 4:
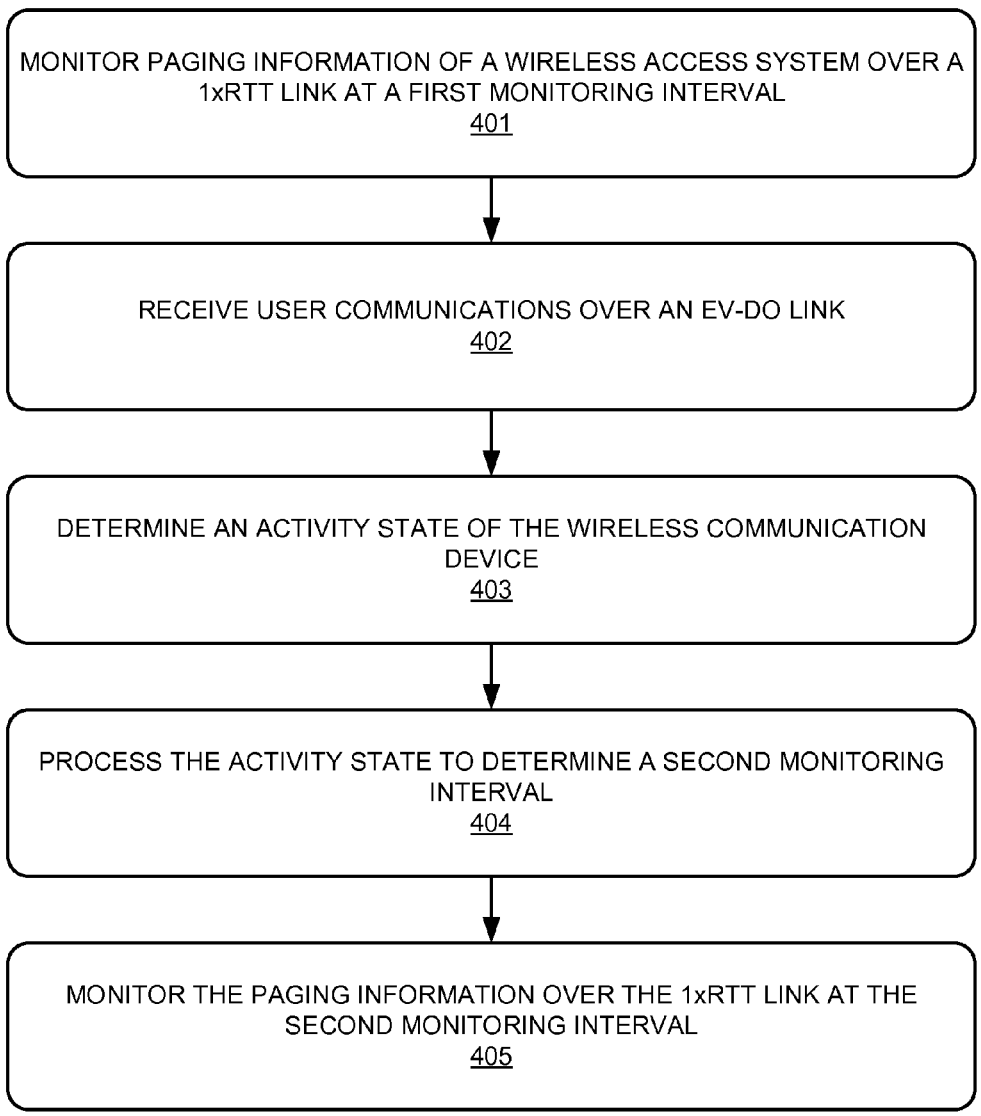
FIG. 4 is a flow diagram illustrating a method of operation of a wireless communication device.

FIG. 4 is a flow diagram illustrating a method of operating wireless communication device 310. The operations of FIG. 4 are referenced herein parenthetically. In FIG. 4, wireless communication device 310 monitors (401) paging information of wireless access system 320 over wireless link 340 at a first monitoring interval. In this example, 1xRTT transceiver 311 of wireless communication device 310 monitors for paging information transferred by paging system 322 through 1xRTT system 321 of wireless access system 320. The first monitoring interval is a recurring periodic interval which indicates to wireless communication device 310 when to check for paging information over wireless link 340 from 1xRTT system 321. Wireless communication device 310 could be engaging in other activities when the first monitoring interval is reached. For example, wireless communication device 310 could be engaging in user communications over wireless link 340 or 341 via a user communications frequency spectrum, frequency band, communication channel, or timeslot, and when the first monitoring interval is reached, wireless communication device 310 would tune away to a different frequency spectrum, frequency band, communication channel, or timeslot to monitor the paging information. The first monitoring interval could be a default, or network default, monitoring interval. In some examples, the first monitoring interval is initially set to 5.12 seconds, where wireless communication device 310 periodically checks for paging information upon the expiration of the monitoring interval.

Wireless communication device 310 receives (402) user communications over wireless link 341. In this example, wireless link 341 uses the EV-DO wireless protocol and frequency spectrum, and EV-DO transceiver 312 of wireless communication device 310 communicates over wireless link 341 with EV-DO system 323 of wireless access system 320. The user communications could comprise a data transfer, voice call, voice over IP (VoIP) call, video stream, e-book download, music stream, video game communication, among other user communications. The user communications could be received during the monitoring interval or upon expiration of the monitoring interval.

Wireless communication device 310 determines (403) an activity state of wireless communication device 310. For example, if wireless communication device 310 is presently exchanging user communications over EV-DO wireless link 341, the activity state could be determined to be active. In other examples, if no user communications are presently being exchanged over EV-DO wireless link 341, then the activity state could be determined to be idle. In further examples, an application type of the user communications is determined, such as a video application, game application, voice call application, among other applications, where the application, when active, could indicate an active activity state. In yet further examples, a speed of motion of wireless communication device is determined, such as via a global positioning system (GPS) receiver or an internal accelerometer of wireless communication device 310. Different speeds of motion could be correlated to different levels of activity of wireless communication device 310, such as where a high speed of motion could indicate a high activity level and a low speed of motion could indicate a low activity level. In yet further examples, a wireless communication mode could be considered, such as when wireless communication device 310 is communicating over link 341 in the EV-DO communication mode, then the activity level could be determined to be active. Other forms of activity level could be considered, such as network registration status, soft handoff information, a wireless protocol used in present communications, among other information.

Wireless communication device 310 processes (404) the activity state to determine a second monitoring interval. As discussed above, the activity state could be determined by different example methods. In some examples, if the activity state indicates an active state, then the second monitoring interval is determined to be greater than the first monitoring interval. In other examples, if the activity state indicates an idle state, then the second monitoring interval is determined to be smaller than the first monitoring interval. For example, if user communications are being presently exchanged by wireless communication device 310 with wireless access system 320, then the activity state could be processed to determine a larger monitoring interval than the first monitoring interval. As a further example, if an application is active on wireless communication device 310, such as a data transfer application, then the first monitoring interval could be increased to a longer interval. In examples where a speed of motion is considered, then the first monitoring interval could be decreased during a fast speed of motion and increased during a slow speed of motion.

Wireless communication device 310 monitors (405) the paging information of wireless access system 320 over wireless link 340 at the second monitoring interval. In this example, 1xRTT transceiver 311 of wireless communication device 310 monitors for paging information transferred by paging system 322 through 1xRTT system 321 of wireless access system 320. The 1xRTT protocol is employed over wireless link 340, using the 1xRTT frequency spectrum. The second monitoring interval is a recurring periodic interval which indicates to wireless communication device 310 when to check for paging information over wireless link 340 from 1xRTT system 321. Wireless communication device 310 could be engaging in other activities when the second monitoring interval is reached. For example, wireless communication device 310 could be engaging in user communications over wireless link 341 using an EV-DO frequency spectrum, frequency band, communication channel, or timeslot. When the second monitoring interval is reached, wireless communication device 310 would tune away to a 1xRTT frequency spectrum, frequency band, communication channel, or timeslot to monitor the paging information over wireless link 340 from 1xRTT system 321. It should be understood that other wireless protocols or wireless communication modes could employ similar operations as the 1xRTT/EV-DO example discussed above.

Figure 5:
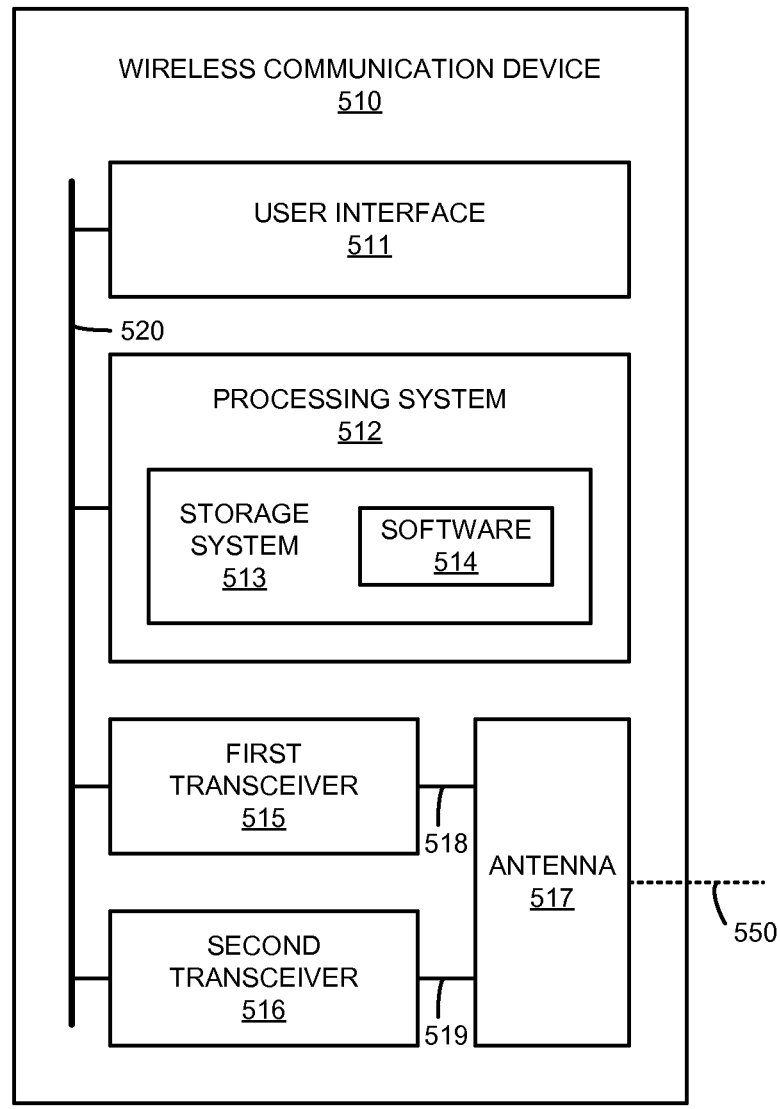
FIG. 5 is a block diagram illustrating a wireless communication device.

FIG. 5 is a block diagram illustrating wireless communication device 510, as an example of wireless communication device 110 found in FIG. 1 or wireless communication device 310 found in FIG. 3, although wireless communication devices 110 and 310 could use other configurations. Wireless communication device 510 includes user interface 511, processing system 512, first transceiver 515, second transceiver 516, and antenna 517. User interface 511, processing system 512, first transceiver 515, and second transceiver 516 communicate over bus 520. First transceiver 515 and antenna 517 communicate over link 518. Second transceiver 516 and antenna 517 communicate over link 519. Wireless communication device 510 may be distributed or consolidated among devices that together form elements 511-520.

User interface 511 includes equipment and circuitry for receiving user input and control. Examples of the equipment and circuitry for receiving user input and control include push buttons, touch screens, selection knobs, dials, switches, actuators, keys, keyboards, pointer devices, microphones, transducers, potentiometers, non-contact sensing circuitry, or other human-interface equipment. User interface 511 also includes equipment to communicate information to a user of wireless communication device 510. Examples of the equipment to communicate information to the user could include displays, indicator lights, lamps, light-emitting diodes, haptic feedback devices, audible signal transducers, speakers, buzzers, alarms, vibration devices, or other indicator equipment, including combinations thereof.

Processing system 512 includes storage system 513. Processing system 512 retrieves and executes software 514 from storage system 513. Processing system 512 could incorporate a computer microprocessor, logic circuit, or some other processing device, and may be distributed among multiple processing devices. Storage system 513 could include computer-readable media such as disks, tapes, integrated circuits, servers, or some other memory device, and also may be distributed among multiple memory devices. Software 514 may include an operating system, logs, utilities, drivers, networking software, and other software typically loaded onto a computer system. Software 514 could contain an application program, firmware, or some other form of computer-readable processing instructions. When executed by processing system 512, software 514 directs wireless communication device 510 to operate as described herein to at least determine a timer or monitoring interval for monitoring information over a wireless communication mode, instruct first transceiver 515 or second transceiver 516 to tune away to different frequency spectrums, and determine an activity state of wireless communication device 510, among other operations.

First transceiver 515 and second transceiver 516 each comprise radio frequency (RF) communication circuitry. First transceiver 515 and second transceiver 516 could also each include amplifiers, filters, modulators, and signal processing circuitry. In this example, each of first transceiver 515 and second transceiver 516 can exchange instructions and information with processing system 512 over bus 520. First transceiver 515 and second transceiver 516 also each communicate with wireless access systems, such as base stations, omitted for clarity, through antenna 517 over wireless link 550, to access communication services and exchange communications of the communication services, tune away to different frequency spectrums, and monitor information from a wireless access system.

Antenna 517 includes an antenna or antenna array, and could include additional circuitry such as impedance matching elements, physical structures, wires, or other elements. Antenna 517 can exchange RF communications with each of first transceiver 515 and second transceiver 516 and may include multiplexing circuitry. Antenna 517 supports wireless communications over multiple frequency spectrums, and could include separate antenna elements for each frequency spectrum, although other configurations could be employed. Antenna 517 allows for communication of wireless communication device 510 over wireless link 550.

Wireless link 550 could use various protocols or communication formats as described herein for wireless links 140-141 and 340-341, including combinations, variations, or improvements thereof. Links 518-519 comprise wireline RF links in this example. Links 518-519 each exchange RF energy and communications between antenna 517 and each of first transceiver 515 and second transceiver 516. Links 518-519 could also include wires, waveguides, inductive coupling elements, near-field coupling elements, buffers, impedance matching elements, among other elements.

Bus 520 comprises a physical, logical, or virtual communication link, capable of communicating data, control signals, communications, and power, along with other information and signals. In some examples, bus 520 is encapsulated within any of elements 511-516, and may be a software or logical link. In other examples, bus 520 uses various communication media, such as air, space, metal, optical fiber, or some other signal propagation path, including combinations thereof. Bus 520 could be a direct link or might include various equipment, intermediate components, systems, and networks.

Referring back to FIG. 1, wireless communication device 110 comprises radio frequency (RF) communication circuitry and antenna elements. The RF communication circuitry typically includes amplifiers, filters, modulators, and signal processing circuitry. In many examples, wireless communication device 110 includes circuitry and equipment to exchange communications of multiple wireless communication services over multiple wireless links, or with multiple base stations. Wireless communication device 110 may also include user interface systems, memory devices, computer-readable storage mediums, software, processing circuitry, or other communication components. Wireless communication device 110 may be a user device, subscriber equipment, customer equipment, access terminal, telephone, mobile wireless telephone, computer, e-book, mobile Internet appliance, wireless network interface card, media player, game console, or some other wireless communication apparatus, including combinations thereof. Although one wireless communication device is shown in FIG. 1, it should be understood that a different number of wireless communication devices could be shown.

Wireless access system 120 comprises RF communication and control circuitry, antenna elements, and communication routing equipment and systems. The RF communication circuitry typically includes amplifiers, filters, RF modulators, transceivers, and signal processing circuitry. In many examples, wireless access system 120 includes equipment to provide wireless access and communication services over different communication modes to user devices, such as wireless communication device 110 shown in FIG. 1, as well as route user communications between core network 130 and wireless communication device 110, or provide network information or paging information to wireless communication device 110. Wireless access system 120 may also comprise data modems, routers, servers, memory devices, software, processing systems, cabling, network communication interfaces, physical structural supports, or other communication apparatuses. Wireless access system 120 may also comprise base stations, base transceiver stations, base station controllers (BSC), mobile switching centers (MSC), radio node controllers (RNC), or other communication equipment and apparatuses.

Core network 130 could include further wireless access systems, or could include base station controllers (BSC), mobile switching centers (MSC), radio node controllers (RNC), call processing systems, authentication, authorization and accounting (AAA) equipment, access service network gateways (ASN-GW), Internet access nodes, telephony service nodes, wireless data access points, or other wireless communication systems, including combinations thereof. Core network 130 may also comprise optical networks, asynchronous transfer mode (ATM) networks, packet networks, metropolitan-area networks (MAN), or other network topologies, equipment, or systems, including combinations thereof. In typical examples, core network 130 includes many wireless access systems and associated equipment for providing communication services to many user devices across a geographic region.

Wireless links 140-141 each use the air or space as the transport media. Wireless links 140-141 may each use various protocols, such as Code Division Multiple Access (CDMA), Evolution-Data Optimized (EV-DO), single-carrier radio transmission technology link (1xRTT), Worldwide Interoperability for Microwave Access (WIMAX), Global System for Mobile Communication (GSM), Universal Mobile Telecommunications System (UMTS), Long Term Evolution (LTE), Wireless Fidelity (WIFI), High Speed Packet Access (HSPA), Radio Link Protocol (RLP), or some other wireless communication format, including combinations, improvements, or variations thereof. Although two wireless links 140-141 are shown in FIG. 1, it should be understood that these separate wireless links are merely illustrative to show two communication modes or wireless access pathways for wireless communication device 110. In other examples, a single wireless link could be shown, with portions of the wireless link used for different communication modes, frequency spectrums, or user communication sessions, with associated paging or overhead communications.

Communication link 142 uses metal, glass, optical, air, space, or some other material as the transport media. Communication link 142 could use various communication protocols, such as Time Division Multiplex (TDM), asynchronous transfer mode (ATM), Internet Protocol (IP), Ethernet, synchronous optical networking (SONET), circuit-switched, communication signaling, or some other communication format, including combinations, improvements, or variations thereof. Communication link 142 could be a direct links or may include intermediate networks, systems, or devices.

Links 140-142 may each include many different signals sharing the same link—as represented by the associated lines in FIG. 1—comprising access channels, paging channels, notification channels, forward links, reverse links, user communications, communication sessions, overhead communications, frequencies, other channels, carriers, timeslots, spreading codes, transportation ports, logical transportation links, network sockets, packets, or communication directions. In many examples, the portion of wireless links 140-141 as transmitted by wireless communication device 110 is referred to an uplink or reverse link of the wireless link, while the portion as transmitted by wireless access system 120 is referred to as a downlink or forward link of the wireless link.

FIGS. 1-5 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication device, the method comprising:
   entering an active state in a first wireless communication mode that requires tuning to a first frequency spectrum, and in response, setting a timer for monitoring a second wireless communication mode;
   determining when the timer expires during the active state in the first wireless communication mode, and responsively tuning away from the first frequency spectrum to a second frequency spectrum for the second wireless communication mode and monitoring information for the second wireless communication mode; and
   determining when the wireless communication device transitions from the active state to an idle state in the first wireless communication mode before the timer expires, and responsively tuning away from the first frequency spectrum to the second frequency spectrum for the second wireless communication mode and monitoring the information for the second wireless communication mode.

2. The method of claim 1, wherein setting the timer for monitoring the second wireless communication mode comprises determining an application type of user communications over the first wireless communication mode and setting the timer based upon the application type.

3. The method of claim 1, wherein setting the timer for monitoring the second wireless communication mode comprises determining a speed of motion of the wireless communication device, and decreasing the timer if the speed of motion of the wireless communication device increases.

4. The method of claim 1, wherein setting the timer for monitoring the second wireless communication mode comprises determining a speed of motion of the wireless communication device, and increasing the timer if the speed of motion of the wireless communication device decreases.

5. The method of claim 1, wherein the first wireless communication mode comprises an Evolution Data Optimized (EV-DO) wireless communication mode, and the second wireless communication mode comprises a Code Division Multiple Access (CDMA) single-carrier radio transmission technology (1xRTT) wireless communication mode.

6. The method of claim 1, wherein the information for the second wireless communication mode comprises paging information.

7. A wireless communication device, comprising:
   a processing system configured to enter an active state in a first wireless communication mode that requires tuning a transceiver to a first frequency spectrum, and in response, the processing system configured to set a timer for monitoring a second wireless communication mode;
   the processing system configured to determine when the timer expires during the active state in the first wireless communication mode, and in response the transceiver is configured to tune away from the first frequency spectrum to a second frequency spectrum for the second wireless communication mode and monitor information for the second wireless communication mode; and
   the processing system configured to determine when the wireless communication device transitions from the active state to an idle state in the first wireless communication mode before the timer expires, and in response the transceiver is configured to tune away from the first frequency spectrum to the second frequency spectrum for the second wireless communication mode and monitor the information for the second wireless communication mode.

8. The wireless communication device of claim 7, wherein the processing system is configured to determine an application type of user communications over the first wireless communication mode and set the timer based upon the application type.

9. The wireless communication device of claim 7, wherein the processing system is configured to determine a speed of motion of the wireless communication device, and decrease the timer if the speed of motion of the wireless communication device increases.

10. The wireless communication device of claim 7, wherein the processing system is configured to determine a speed of motion of the wireless communication device, and increase the timer if the speed of motion of the wireless communication device decreases.

11. The wireless communication device of claim 7, wherein the first wireless communication mode comprises an Evolution Data Optimized (EV-DO) wireless communication mode, and the second wireless communication mode comprises a Code Division Multiple Access (CDMA) single-carrier radio transmission technology (1xRTT) wireless communication mode.

12. The wireless communication device of claim 7, wherein the information for the second wireless communication mode comprises paging information.

* * * * *